US012300260B2

(12) United States Patent
Robben et al.

(10) Patent No.: US 12,300,260 B2
(45) Date of Patent: May 13, 2025

(54) AUDIO SIGNAL PROCESSING METHOD AND SYSTEM FOR NOISE MITIGATION OF A VOICE SIGNAL MEASURED BY AIR AND BONE CONDUCTION SENSORS

(71) Applicant: Analog Devices International Unlimited Company, Limerick (IE)

(72) Inventors: Stijn Robben, Boutersem (BE); Yussef Hussenbocus, Heverlee (BE)

(73) Assignee: Analog Devices International Unlimited Company, Limerick (IE)

( * ) Notice: Subject to any disclaimer, the term of this patent is extended or adjusted under 35 U.S.C. 154(b) by 580 days.

(21) Appl. No.: 17/667,041

(22) Filed: Feb. 8, 2022

(65) Prior Publication Data

US 2023/0253002 A1 Aug. 10, 2023

(51) Int. Cl.

| | |
|---|---|
| ***G10L 21/0232*** | (2013.01) |
| ***G10L 25/18*** | (2013.01) |
| ***H04R 1/10*** | (2006.01) |
| ***H04R 3/04*** | (2006.01) |

(52) U.S. Cl.

CPC .......... *G10L 21/0232* (2013.01); *G10L 25/18* (2013.01); *H04R 1/1041* (2013.01); *H04R 3/04* (2013.01)

(58) Field of Classification Search

None

See application file for complete search history.

(56) References Cited

U.S. PATENT DOCUMENTS

| | | | | |
|---|---|---|---|---|
| 10,553,236 | B1 * | 2/2020 | Ayrapetian | H04B 17/26 |
| 11,217,264 | B1 * | 1/2022 | Yang | G10L 25/51 |
| 2012/0278070 | A1 | 11/2012 | Herve et al. | |

(Continued)

FOREIGN PATENT DOCUMENTS

| | | |
|---|---|---|
| EP | 0683621 | 3/2002 |
| JP | 2003264883 | 9/2003 |
| WO | WO-2023152196 A1 | 8/2023 |

OTHER PUBLICATIONS

"International Application Serial No. PCT EP2023 053138, International Search Report mailed May 12, 2023", 4 pgs.

(Continued)

*Primary Examiner* — Nicole A K Schmieder

(74) *Attorney, Agent, or Firm* — Schwegman Lundberg & Woessner, P.A.

(57) ABSTRACT

Disclosed is an audio signal processing method, including measuring a voice signal by internal and external sensors. The internal sensor measures voice signals that propagate internally to the user's head. The external sensor measures voice signals that propagate externally to the user's head. The internal and external sensors produces first and second audio signals, respectively. The method further includes: processing the first audio signal to produce a first audio spectrum on a frequency band; processing the second audio signal to produce a second audio spectrum on the frequency band; computing a first cumulated audio spectrum by cumulating first audio spectrum values; computing a second cumulated audio spectrum by cumulating second audio spectrum values; determining a cutoff frequency by comparing the first and second cumulated audio spectra; and producing an output signal by combining the first audio signal and the second audio signal based on the cutoff frequency.

15 Claims, 5 Drawing Sheets

(56) References Cited

U.S. PATENT DOCUMENTS

| | | | | |
|---|---|---|---|---|
| 2021/0243523 | A1 | 8/2021 | Hui et al. | |
| 2022/0167087 | A1* | 5/2022 | Laaksonen ............. | H04R 5/033 |

OTHER PUBLICATIONS

"International Application Serial No. PCT EP2023 053138, Written Opinion mailed May 12, 2023", 7 pgs.
"International Application Serial No. PCT/EP2023/053138, International Preliminary Report on Patentability mailed Aug. 22, 2024", 9 pgs.

* cited by examiner a)

b)

a)

b)

AUDIO SIGNAL PROCESSING METHOD AND SYSTEM FOR NOISE MITIGATION OF A VOICE SIGNAL MEASURED BY AIR AND BONE CONDUCTION SENSORS

BACKGROUND OF THE INVENTION

Field of the Invention

The present disclosure relates to audio signal processing and relates more specifically to a method and computing system for noise mitigation of a voice signal measured by at least two sensors, e.g. an air conduction sensor and a bone conduction sensor.

The present disclosure finds an advantageous application, although in no way limiting, in wearable devices such as earbuds or earphones used as a microphone during a voice call established using a mobile phone.

Description of the Related Art

To improve picking up a user's voice signal in noisy environments, wearable devices like earbuds or earphones are typically equipped with different types of audio sensors such as microphones and/or accelerometers. These audio sensors are usually positioned such that at least one audio sensor picks up mainly air-conducted voice (air conduction sensor) and such that at least another audio sensor picks up mainly bone-conducted voice (bone conduction sensor).

Compared to air conduction sensors, bone conduction sensors pick up the user's voice signal with less ambient noise but with a limited spectral bandwidth (mainly low frequencies), such that the bone-conducted signal can be used to enhance the air-conducted signal and vice versa.

In many existing solutions which use both an air conduction sensor and a bone conduction sensor, the air-conducted signal and the bone-conducted signal are not mixed together, i.e. the audio signals of respectively the air conduction sensor and the bone conduction sensor are not used simultaneously in the output signal. For instance, the bone-conducted signal is used for robust voice activity detection only or for extracting metrics that assist the denoising of the air-conducted signal. Using only the air-conducted signal in the output signal has the drawback that the output signal will generally contain more ambient noise, thereby e.g. increasing conversation effort in a noisy or windy environment for the voice call use case. Using only the bone-conducted signal in the output signal has the drawback that the voice signal will generally be strongly low-pass filtered in the output signal, causing the user's voice to sound muffled thereby reducing intelligibility and increasing conversation effort.

Some existing solutions propose mixing the bone-conducted signal and the air-conducted signal using a static (non-adaptive) mixing scheme, meaning the mixing of both audio signals is independent of the user's environment (i.e. the same in clean and noisy environment conditions). Such static mixing schemes have the drawbacks that the bone-conducted signal might be overused compared to the more superior air-conducted signal (sounds more natural) in noiseless environment scenarios, while in noisy environment scenarios the air-conducted signal might be overused compared to the bone-conducted signal which is superior (contains less noise).

Some other existing solutions propose to mix the bone-conducted signal and the air-conducted signal using an adaptive scheme. In such adaptive schemes, the noise is first estimated, and the mixing of both audio signals is done adaptively based on the estimated noise. However, the noise estimators are often slow (i.e. they introduce a non-negligible latency in the audio signal processing chain) and inaccurate. Also, using such noise estimation algorithms increases the computational complexity, memory footprint and power consumption required for mixing the audio signals.

SUMMARY OF THE INVENTION

The present disclosure aims at improving the situation. In particular, the present disclosure aims at overcoming at least some of the limitations of the prior art discussed above, by proposing a solution for adaptive mixing of audio signals that can adapt quickly without relying on noise estimation.

For this purpose, and according to a first aspect, the present disclosure relates to an audio signal processing method, comprising measuring a voice signal emitted by a user, said measuring of the voice signal being performed by at least two sensors which include an internal sensor and an external sensor, wherein the internal sensor is arranged to measure voice signals which propagate internally to the user's head and the external sensor is arranged to measure voice signals which propagate externally to the user's head, wherein the internal sensor produces a first audio signal and the external sensor produces a second audio signal, wherein the audio signal processing method further comprises:

- processing the first audio signal to produce a first audio spectrum on a frequency band,
- processing the second audio signal to produce a second audio spectrum on the frequency band,
- computing a first cumulated audio spectrum by cumulating first audio spectrum values,
- computing a second cumulated audio spectrum by cumulating second audio spectrum values,
- determining a cutoff frequency by comparing the first cumulated audio spectrum and the second cumulated audio spectrum,
- producing an output signal by combining the first audio signal and the second audio signal based on the cutoff frequency.

Hence, the present disclosure relies also on the combination of at least two different audio signals representing the same voice signal: a first audio signal acquired by an internal sensor (which measures voice signals which propagate internally to the user's head, i.e. bone-conducted signals) and a second audio signal acquired by an external sensor (which measures voice signals which propagate externally to the user's head, i.e. air-conducted signals). In order to adaptively combine these two audio signals, the present disclosure proposes to perform a simple spectral analysis of both audio signals which comprises mainly determining the frequency spectra of both audio signals (by using e.g. a fast Fourier transform, FFT, a discrete cosine transform, DCT, a filter bank, etc.) on a predetermined frequency band. As discussed above, an internal sensor such as a bone conduction sensor has a limited spectral bandwidth and the frequency band considered corresponds to a band included in the spectral bandwidth of the internal sensor, composed mainly of the lowest frequencies of voice signals. For instance, the frequency band is composed of frequencies below 4000 hertz, or below 3000 hertz, or below 2000 hertz. For instance, the frequency band considered is composed of frequencies in [0, 1500] hertz. Then, the computed frequency spectra are cumulated, and the cumulated audio spectra are evaluated to estimate a cutoff frequency in the frequency band. Then this cutoff frequency is used to combine (mix) the audio signals, wherein the output signal is mainly determined based on the first audio signal below the cutoff frequency and is mainly determined based on the second audio signal above the cutoff frequency. Hence, the resulting output signal is composed by the spectral parts of both audio signals that contain the least energy at any moment in time and which therefore contain the voice component with least noise. The cutoff frequency varies with the noise environment scenarios, by performing only a spectrum analysis of the two audio signals. Such an instantaneous spectrum analysis can be carried out with a low computational complexity, and the proposed solution adapts quickly to varying noise environment conditions.

In specific embodiments, the audio signal processing method may further comprise one or more of the following optional features, considered either alone or in any technically possible combination.

In specific embodiments, producing the output signal comprises:

- low-pass filtering the first audio signal based on the cutoff frequency to produce a filtered first audio signal,
- high-pass filtering the second audio signal based on the cutoff frequency to produce a filtered second audio signal,
- combining the filtered first audio signal and the filtered second audio signal to produce the output audio signal.

In specific embodiments, the audio signal processing method further comprises mapping the first audio spectrum and the second audio spectrum, wherein mapping the first audio spectrum and the second audio spectrum comprises applying predetermined weighting coefficients to the first audio spectrum and/or the second audio spectrum.

Indeed, the first audio spectrum and the second audio spectrum might need in some cases to be pre-processed in order to make their first cumulated audio spectrum and second cumulated audio spectrum comparable. This is performed for instance by applying weighting coefficients to the first audio spectrum values and/or to the second audio spectrum values. Such weighting coefficients are predetermined during a prior calibration phase by using e.g. reference audio signals in predefined reference noise environment scenarios with associated desired cutoff frequencies. In other words, the weighting coefficients are predetermined during the prior calibration phase to ensure that reference audio signals measured in a predefined reference noise environment scenario yields approximately the associated desired cutoff frequency in the frequency band.

In specific embodiments, the audio signal processing method further comprises applying predetermined offset coefficients to the first audio spectrum and/or the second audio spectrum.

In specific embodiments, the audio signal processing method further comprises thresholding the first audio spectrum and/or the second audio spectrum with respect to at least one predetermined threshold.

In specific embodiments, the first cumulated audio spectrum is determined by cumulating the first audio spectrum values from a minimum frequency of the frequency band to a maximum frequency of the frequency band, and the second cumulated audio spectrum is determined by cumulating the second audio spectrum values from the minimum frequency of the frequency band to the maximum frequency of the frequency band.

In specific embodiments, the cutoff frequency is determined based on the highest frequency in the frequency band for which the first cumulated audio spectrum is below the second cumulated audio spectrum and corresponds to the minimum frequency of the frequency band if the first cumulated frequency spectrum is above the second cumulated frequency spectrum over the whole frequency band, and the weighting coefficients are predetermined based on reference first audio signals and based on reference second audio signals, such that:

- in the absence of noise in the reference first audio signals and the reference second audio signals, a reference mean first cumulated audio spectrum is above a reference mean second cumulated audio spectrum over the whole frequency band, and
- in the presence of white noise affecting the reference second audio signals and having a level above a predetermined threshold, and in the absence of noise in the reference first audio signals, the reference mean first cumulated audio spectrum is below the reference mean second cumulated audio spectrum for at least the maximum frequency of the frequency band.

In specific embodiments, the first cumulated audio spectrum is determined by cumulating the first audio spectrum values from a minimum frequency of the frequency band to a maximum frequency of the frequency band, and the second cumulated audio spectrum is determined by cumulating the second audio spectrum values from the maximum frequency of the frequency band to the minimum frequency of the frequency band.

In specific embodiments, the cutoff frequency is determined based on the frequency in the frequency band for which a sum of the first cumulated audio spectrum and of the second cumulated spectrum is minimized.

In specific embodiments, the first cumulated audio spectrum is determined by cumulating the first audio spectrum values from a minimum frequency of the frequency band to a maximum frequency of the frequency band, the second cumulated audio spectrum is determined by cumulating the second audio spectrum values from the minimum frequency of the frequency band to the maximum frequency of the frequency band, and the cutoff frequency is determined based on the highest frequency in the frequency band for which the first cumulated audio spectrum is below the second cumulated audio spectrum.

According to a second aspect, the present disclosure relates to an audio signal processing system comprising at least two sensors which include an internal sensor and an external sensor, wherein the internal sensor is arranged to measure voice signals which propagate internally to the user's head and the external sensor is arranged to measure voice signals which propagate externally to the user's head, wherein the internal sensor is configured to produce a first audio signal by measuring a voice signal emitted by the user and the external sensor is configured to produce a second audio signal by measuring the voice signal emitted by the user, said audio signal processing system further comprising a processing circuit comprising at least one processor and at least one memory, wherein said processing circuit is configured to:

- process the first audio signal to produce a first audio spectrum on a frequency band,
- process the second audio signal to produce a second audio spectrum on the frequency band,
- compute a first cumulated audio spectrum by cumulating first audio spectrum values,
- compute a second cumulated audio spectrum by cumulating second audio spectrum values, determine a cutoff frequency by comparing the first cumulated audio spectrum and the second cumulated audio spectrum, produce an output signal by combining the first audio signal and the second audio signal based on the cutoff frequency.

In specific embodiments, the audio signal processing system may further comprise one or more of the following optional features, considered either alone or in any technically possible combination.

In specific embodiments, the processing circuit is further configured to produce the output signal by:

low-pass filtering the first audio signal based on the cutoff frequency to produce a filtered first audio signal, high-pass filtering the second audio signal based on the cutoff frequency to produce a filtered second audio signal, combining the filtered first audio signal and the filtered second audio signal to produce the output audio signal.

In specific embodiments, the processing circuit is further configured to map the first audio spectrum and the second audio spectrum before computing the first cumulated audio spectrum and the second cumulated audio spectrum, wherein mapping the first audio spectrum and the second audio spectrum comprises applying predetermined weighting coefficients to the first audio spectrum and/or the second audio spectrum in the frequency band.

In specific embodiments, the processing circuit is further configured to apply predetermined offset coefficients to the first audio spectrum and/or the second audio spectrum.

In specific embodiments, the processing circuit is further configured to threshold the first audio spectrum and/or the second audio spectrum with respect to at least one predetermined threshold.

In specific embodiments, the processing circuit is further configured to:

determine the first cumulated audio spectrum by cumulating the first audio spectrum values from a minimum frequency of the frequency band to a maximum frequency of the frequency band, and determine the second cumulated audio spectrum by cumulating the second audio spectrum values from the minimum frequency of the frequency band to the maximum frequency of the frequency band.

In specific embodiments, the cutoff frequency is determined based on the highest frequency in the frequency band for which the first cumulated audio spectrum is below the second cumulated audio spectrum and corresponds to the minimum frequency of the frequency band if the first cumulated frequency spectrum is above the second cumulated frequency spectrum over the whole frequency band, and the weighting coefficients are predetermined based on reference first audio signals and based on reference second audio signals, such that:

in the absence of noise in the reference first audio signals and the reference second audio signals, a reference mean first cumulated audio spectrum is above a reference mean second cumulated audio spectrum over the whole frequency band, and in the presence of white noise affecting the reference second audio signals and having a level above a predetermined threshold, and in the absence of noise in the reference first audio signals, the reference mean first cumulated audio spectrum is below the reference mean second cumulated audio spectrum for at least the maximum frequency of the frequency band.

In specific embodiments, the processing circuit is further configured to:

determine the first cumulated audio spectrum by cumulating the first audio spectrum values from a minimum frequency of the frequency band to a maximum frequency of the frequency band, and determine the second cumulated audio spectrum by cumulating the second audio spectrum values from the maximum frequency of the frequency band to the minimum frequency of the frequency band.

In specific embodiments, the cutoff frequency is determined based on the frequency in the frequency band for which a sum of the first cumulated audio spectrum and of the second cumulated spectrum is minimized.

In specific embodiments, the processing circuit is further configured to:

determine the first cumulated audio spectrum by cumulating the first audio spectrum values from a minimum frequency of the frequency band to a maximum frequency of the frequency band, determine the second cumulated audio spectrum by cumulating the second audio spectrum values from the minimum frequency of the frequency band to the maximum frequency of the frequency band, and determine the cutoff frequency based on the highest frequency in the frequency band for which the first cumulated audio spectrum is below the second cumulated audio spectrum.

In specific embodiments, the audio signal processing system is included in a wearable device.

In specific embodiments, the audio signal processing system is included in earbuds or in earphones.

According to a third aspect, the present disclosure relates to a non-transitory computer readable medium comprising computer readable code to be executed by an audio signal processing system comprising at least two sensors which include an internal sensor and an external sensor, wherein the internal sensor is arranged to measure voice signals which propagate internally to the user's head and the external sensor is arranged to measure voice signals which propagate externally to the user's head, wherein the audio signal processing system further comprises a processing circuit comprising at least one processor and at least one memory, wherein said computer readable code cause said audio signal processing system to:

produce, by the internal sensor, a first audio signal by measuring a voice signal emitted by the user, produce, by the external sensor, a second audio signal by measuring the voice signal emitted by the user, process the first audio signal to produce a first audio spectrum on a frequency band, process the second audio signal to produce a second audio spectrum on the frequency band, compute a first cumulated audio spectrum by cumulating the first audio spectrum values, compute a second cumulated audio spectrum by cumulating the second audio spectrum values, determine a cutoff frequency by comparing the first cumulated audio spectrum and the second cumulated audio spectrum, produce an output signal by combining the first audio signal and the second audio signal based on the cutoff frequency.

BRIEF DESCRIPTION OF DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

Also, the order of steps represented in these figures is provided only for illustration purposes and is not meant to limit the present disclosure which may be applied with the same steps executed in a different order.

DESCRIPTION OF THE PREFERRED EMBODIMENTS

As indicated above, the present disclosure relates inter alia to an audio signal processing method 20 for mitigating noise when combining audio signals from different audio sensors.

Figure 1:
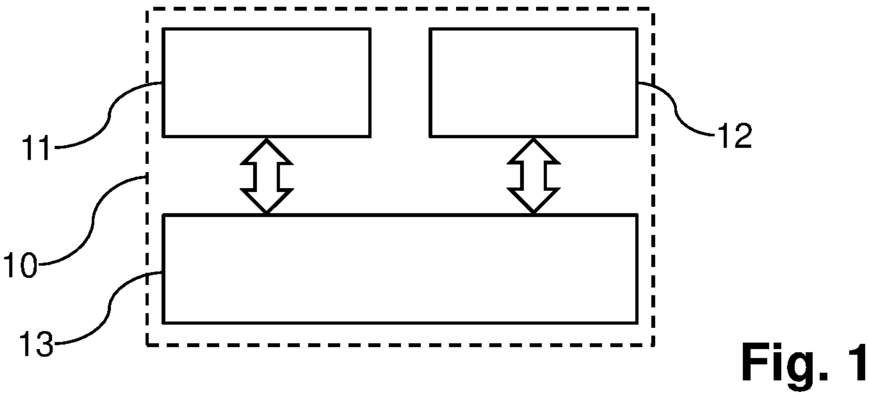
FIG. 1: a schematic representation of an exemplary embodiment of an audio signal processing system.

FIG. 1 represents schematically an exemplary embodiment of an audio signal processing system 10. In some cases, the audio signal processing system is included in a device wearable by a user. In preferred embodiments, the audio signal processing system 10 is included in earbuds or in earphones.

As illustrated by FIG. 1, the audio signal processing system 10 comprises at least two audio sensors which are configured to measure voice signals emitted by the user of the audio signal processing system 10.

One of the audio sensors is referred to as internal sensor 11. The internal sensor 11 is referred to as "internal" because it is arranged to measure voice signals which propagate internally to the user's head. For instance, the internal sensor 11 may be an air conduction sensor to be located in an ear canal of a user and arranged on the wearable device towards the interior of the user's head, or a bone conduction sensor. If the internal sensor 11 is an air conduction sensor to be located in an ear canal of the user, then the audio signal it produces has mainly the same characteristics as a bone-conducted signal (limited spectral bandwidth, less sensitive to ambient noise), such that the audio signal produced by the internal sensor 11 is referred to as bone-conducted signal regardless of whether it is a bone conduction sensor or an air conduction sensor. The internal sensor 11 may be any type of bone conduction sensor or air conduction sensor known to the skilled person.

The other audio sensor is referred to as external sensor 12. The external sensor 12 is referred to as "external" because it is arranged to measure voice signals which propagate externally to the user's head (via the air between the user's mouth and the external sensor 12). For instance, the external sensor 12 is an air conduction sensor to be located outside the ear canals of the user, or to be located inside an ear canal of the user but arranged on the wearable device towards the exterior of the user's head, such that it produces air-conducted signals. The external sensor 12 may be any type of air conduction sensor known to the skilled person.

For instance, if the audio signal processing system 10 is included in a pair of earbuds (one earbud for each ear of the user), then the internal sensor 11 is for instance arranged in a portion of one of the earbuds that is to be inserted in the user's ear, while the external sensor 12 is for instance arranged in a portion of one of the earbuds that remains outside the user's ears. It should be noted that, in some cases, the audio signal processing system 10 may comprise two or more internal sensors 11 (for instance one for each earbud) and/or two or more external sensors 12 (for instance one for each earbud) which produce audio signals which can mixed together as described herein.

As illustrated by FIG. 1, the audio signal processing system 10 comprises also a processing circuit 13 connected to the internal sensor 11 and to the external sensor 12. The processing circuit 13 is configured to receive and to process the audio signals produced by the internal sensor 11 end the external sensor 12 to produce a noise mitigated output signal.

In some embodiments, the processing circuit 13 comprises one or more processors and one or more memories. The one or more processors may include for instance a central processing unit (CPU), a digital signal processor (DSP), etc. The one or more memories may include any type of computer readable volatile and non-volatile memories (solid-state disk, electronic memory, etc.). The one or more memories may store a computer program product (software), in the form of a set of program-code instructions to be executed by the one or more processors in order to implement the steps of an audio signal processing method 20. Alternatively, or in combination thereof, the processing circuit 13 can comprise one or more programmable logic circuits (FPGA, PLD, etc.), and/or one or more specialized integrated circuits (ASIC), and/or a set of discrete electronic components, etc., for implementing all or part of the steps of the audio signal processing method 20.

Figure 2:
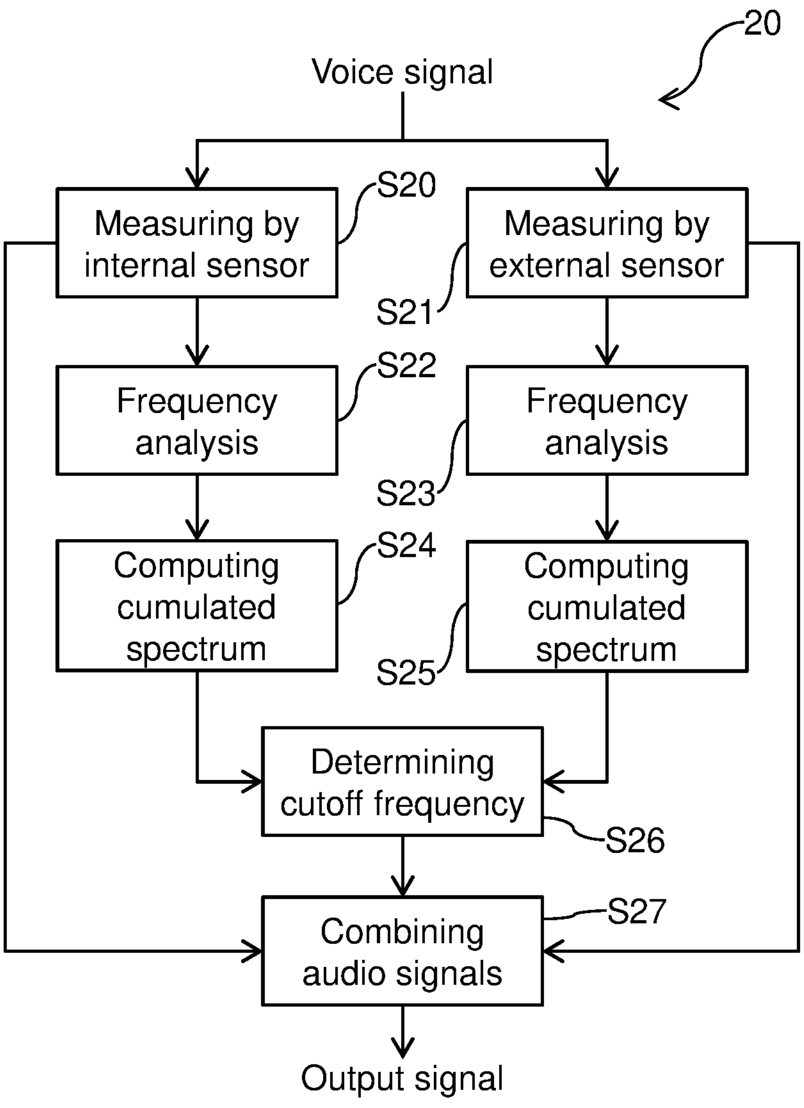
FIG. 2: a diagram representing the main steps of an exemplary embodiment of an audio signal processing method.

FIG. 2 represents schematically the main steps of an audio signal processing method 20 for generating a noise mitigated output signal, which are carried out by the audio signal processing system 10.

As illustrated by FIG. 2, the audio signal processing method 20 comprises a step S20 of measuring, by the internal sensor 11, a voice signal emitted by the user, thereby producing a first audio signal (bone-conducted signal). In parallel, the audio signal processing method 20 comprises a step S21 of measuring the same voice signal by the external sensor 12, thereby producing a second audio signal (air-conducted signal).

Then the audio signal processing method 20 comprises a step S22 of processing the first audio signal to produce a first audio spectrum and a step S23 of processing the second audio signal to produce a second audio spectrum, both executed by the processing circuit 13. Indeed, the first audio signal and the second audio signal are in time domain and the steps S22 and S23 of processing aim at performing a spectral analysis of these audio signals to obtain first and second audio spectra in frequency domain. In some examples, the steps S22 and S23 of spectral analysis may for instance use any time to frequency conversion method, for instance an FFT or a discrete Fourier transform, DFT, a DCT, a wavelet transform, etc. In other examples, the steps S22 and S23 of spectral analysis may for instance use a bank of bandpass filters which filter the first and second audio signals in respective frequency sub-bands of a same frequency band, etc.

The first audio spectrum and the second audio spectrum are computed on a same predetermined frequency band. As discussed above, the internal sensor 11 has a limited spectral bandwidth, and the bone-conducted signal is representative of a low-pass filtered version of the voice signal emitted by the user. Hence, the highest frequencies of the voice signal should not be considered in the comparison of the first audio spectrum and the second audio spectrum since they are strongly attenuated in the first audio signal. Accordingly, the frequency band considered for the first audio spectrum and the second audio spectrum is composed of low frequencies, typically below 4000 hertz (or below 3000 hertz or below 2000 hertz), which are not too much attenuated in the first audio signal produced by the internal sensor 11. The frequency band is defined between a minimum frequency and a maximum frequency. The minimum frequency is for instance below 200 hertz, preferably equal to 0 hertz. The maximum frequency is for instance between 500 hertz and 3000 hertz, preferably between 1000 hertz and 2000 hertz or even between 1250 hertz and 1750 hertz. For instance, the minimum frequency is 0 hertz, and the maximum frequency is 1500 hertz, such that the frequency band corresponds to the frequencies in [0, 1500] hertz.

In the sequel, we assume in a non-limitative manner that the frequency band is composed of N discrete frequency values $f_n$ with $1 \le n \le N$, wherein $f_{min}=f_1$ corresponds to the minimum frequency and $f_{max}=f_N$ corresponds to the maximum frequency, and $f_{n-1}<f_n$ for any $2 \le n \le N$. Hence, the first audio spectrum $S_1$ corresponds to a set of values $\{S_1(f_n), 1 \le n \le N\}$ wherein $S_1(f_n)$ is representative of the power of the first audio signal at the frequency $f_n$. For instance, if the first audio spectrum is computed by an FFT of a first audio signal $s_1$, then $S_1(f_n)$ can correspond to $|FFT[s_1](f_n)|$ (i.e. modulus or absolute level of $FFT[s_1](f_n)$), or to $|FFT[s_1](f_n)|^2$ (i.e. power of $FFT[s_1](f_n)$), etc. Similarly, the second audio spectrum $S_2$ corresponds to a set of values $\{S_2(f_n), 1 \le n \le N\}$ wherein $S_2(f_n)$ is representative of the power of the second audio signal at the frequency $f_n$. More generally, each first (resp. second) audio spectrum value is representative of the power of the first (resp. second) audio signal at a given frequency in the considered frequency band or within a given frequency sub-band in the considered frequency band.

Then the audio signal processing method 20 comprises a step S24 of computing a first cumulated audio spectrum and a step S25 of computing a second cumulated audio spectrum, both executed by the processing circuit 13.

The first cumulated audio spectrum is designated by $S_{1C}$ and is determined by cumulating first audio spectrum values. Hence, each first cumulated audio spectrum value is determined by cumulating a plurality of first audio spectrum values (except maybe for frequencies at the boundaries of the considered frequency band).

For instance, the first cumulated audio spectrum is designated by $S_{1C}$ and is determined by progressively cumulating all the first audio spectrum values from the minimum frequency to the maximum frequency, i.e.:

$$S_{1C}(f_n)=\Sigma_{i=1}^{n} S_1(f_i) \quad (1)$$

In some embodiments, the first audio spectrum values may be cumulated by using weighting factors, for instance a forgetting factor $0<\lambda<1$:

$$S_{1C}(f_n)=\Sigma_{i=1}^{n} \lambda^{n-i} S_1(f_i) \quad (2)$$

Alternatively or in combination, the first audio spectrum values may be cumulated by using a sliding window of predetermined size $K<N$:

$$S_{1C}(f_n)=\Sigma_{i=max(1,n-K)}^{n} S_1(f_i) \quad (3)$$

Similarly, the second cumulated audio spectrum is designated by $S_{2C}$ and is determined by cumulating first audio spectrum values. Hence, each second cumulated audio spectrum value is determined by cumulating a plurality of second audio spectrum values (except maybe for frequencies at the boundaries of the considered frequency band).

As discussed above for the first cumulated audio spectrum, the second cumulated audio spectrum may be determined by progressively cumulating all the second audio spectrum values, for instance from the minimum frequency to the maximum frequency, i.e.:

$$S_{2C}(f_n)=\Sigma_{i=1}^{n} S_2(f_i) \quad (4)$$

Similarly, it is possible, when cumulating second audio spectrum values, to use weighting factors and/or a sliding window:

$$S_{2C}(f_n)=\Sigma_{i=1}^{n} \lambda^{n-i} S_2(f_i) \quad (5)$$

$$S_{2C}(f_n)=\Sigma_{i=max(1,n-K)}^{n} S_2(f_i) \quad (6)$$

Also, it is possible to cumulate first (resp. second) audio spectrum values from the maximum frequency to the minimum frequency, which yields, when all first (resp. second) audio spectrum values are cumulated:

$$S_{1C}(f_n)=\Sigma_{i=n}^{N} S_1(f_i) \quad (7)$$

$$S_{2C}(f_n)=\Sigma_{i=n}^{N} S_2(f_i) \quad (8)$$

Similarly, it is possible to use weighting factors and/or a sliding window when cumulating first (resp. second) audio spectrum values.

In some embodiments, it is possible to cumulate the first audio spectrum values in a different direction than the direction used for cumulating the second audio spectrum values, wherein a direction corresponds to either increasing frequencies in the frequency band (i.e. from the minimum frequency to the maximum frequency) or decreasing frequencies in the frequency band (i.e. from the maximum frequency to the minimum frequency). For instance, it is possible to consider the first cumulated audio spectrum given by equation (1) and the second cumulated audio spectrum given by equation (8):

$$S_{1C}(f_n)=\Sigma_{i=1}^{n} S_1(f_i)$$

$$S_{2C}(f_n)=\Sigma_{i=n}^{N} S_2(f_i)$$

In such a case (different directions used), it is also possible, if desired, to use weighting factors and/or sliding windows when computing the first cumulated audio spectrum and/or the second cumulated audio spectrum.

As illustrated by FIG. 2, the audio signal processing method 20 comprises a step S26 of determining, by the processing circuit, a cutoff frequency by comparing the first cumulated audio spectrum $S_{1C}$ and the second cumulated audio spectrum $S_{2C}$. Basically, the cutoff frequency will be used to mix the first audio signal and the second audio signal wherein the first audio signal will be used mainly below the cutoff frequency and the second audio signal will be used mainly above the cutoff frequency.

Generally speaking, the presence of noise in frequencies of one among the first (resp. second) audio spectrum will locally increase the power for those frequencies of the first (resp. second) audio spectrum. In the presence of colored noise (i.e. frequency-selective noise), in the frequency band, in the second audio spectrum only, then the cutoff frequency should tend towards the maximum frequency $f_{max}$, to favor the first audio signal in the mixing. Similarly, in the presence of colored noise, in the frequency band, in the first audio spectrum only, then the cutoff frequency should tend towards the minimum frequency $f_{min}$, to favor the second audio signal in the mixing. In general, acoustic white noise should affect mainly the second audio spectrum (which corresponds to an air-conducted signal). In the presence of white noise having a high level in the second audio spectrum, then the cutoff frequency should tend towards the maximum frequency $f_{max}$, to favor the first audio signal in the mixing. In the presence of white noise having a low level in the second audio spectrum, then the cutoff frequency can tend towards the minimum frequency $f_{min}$, to favor the second audio signal in the mixing.

The determination of the cutoff frequency, referred to as $f_{CO}$, depends on how the first and second cumulated audio spectra are computed.

For instance, when both the first and second audio spectra are cumulated from the minimum frequency to the maximum frequency of the frequency band (with or without weighting factors and/or sliding window), the cutoff frequency $f_{CO}$ may be determined by comparing directly the first and second cumulated audio spectra. In such a case, the cutoff frequency $f_{CO}$ can for instance be determined based on the highest frequency in the frequency band for which the first cumulated audio spectrum $S_{1C}$ is below the second cumulated audio spectrum $S_{2C}$. Hence, if $S_{1C}(f_n) \geq S_{2C}(f_n)$ for any n>n', with $1 \leq n' \leq N$, and $S_{1C}(f_{n'}) = S_{2C}(f_{n'})$, the cutoff frequency $f_{CO}$ may be determined based on the frequency $f_{n'}$, for instance $f_{CO}=f_{n'}$ or $f_{CO}=f_{n'-1}$. Accordingly, if the first cumulated audio spectrum is greater than the second cumulated audio spectrum for any frequency $f_n$ in the frequency band, then the cutoff frequency corresponds to the minimum frequency $f_{min}$.

According to another example, when the first and second audio spectra are cumulated using different directions (with or without weighting factors and/or sliding window), the cutoff frequency $f_{CO}$ may be determined by comparing indirectly the first and second cumulated audio spectra. For instance, this indirect comparison may be performed by computing a sum $S_\Sigma$ of the first and second cumulated audio spectra, for example as follows:

$$S_\Sigma(f_n) = S_{1C}(f_n) + S_{2C}(f_{n+1})$$

Assuming that the first cumulated audio spectrum is given by equation (1) and that the second cumulated audio spectrum is given by equation (8):

$$S_\Sigma(f_n) = \Sigma_{i=1}^{n} S_1(f_i) + \Sigma_{i=n+1}^{N} S_2(f_i) \quad (9)$$

Hence, the sum $S_\Sigma(f_n)$ can be considered to be representative of the total power on the frequency band of an output signal obtained by mixing the first audio signal and the second audio signal by using the cutoff frequency $f_n$. In principle, minimizing the sum $S_\Sigma(f_n)$ corresponds to minimizing the noise level in the output signal. Hence, the cutoff frequency $f_{CO}$ may be determined based on the frequency for which the sum $S_\Sigma(f_n)$ is minimized. For instance, if:

$$f_{n'} = \arg\left(\min_{f_1 \ldots f_N} (S_\Sigma(f_n))\right) \quad (10)$$

then the cutoff frequency $f_{CO}$ may be determined as $f_{CO}=f_{n'}$, or $f_{CO}=f_{n'-1}$.

As illustrated by FIG. 2, the audio signal processing method 20 then comprises a step S27 of producing, by the processing circuit 13, an output signal by combining the first audio signal and the second audio signal based on the cutoff frequency. As discussed above, the first audio signal should contribute to the output signal mainly below the determined cutoff frequency, while the second audio signal should contribute to the output signal mainly above the determined cutoff frequency. It should be noted that this combination of the first audio signal with the second audio signal can be performed in time and/or frequency domain. Also, before being combined, the first and second audio signals may in some cases undergo optional pre-processing algorithms.

In some embodiments, the combining (mixing) is performed by using a filter bank, which filters and adds together the first audio signal and the second audio signal. The filtering may be performed in time or frequency domain and the addition of the filtered first and second audio signals may be performed in time domain or in frequency domain. Typically, the filter bank produces the output signal by:

- low-pass filtering the first audio signal based on the cutoff frequency to produce a filtered first audio signal,
- high-pass filtering the second audio signal based on the cutoff frequency to produce a filtered second audio signal,
- adding the filtered first audio signal and the filtered second audio signal to produce the output audio signal.

Hence, the filter bank is updated based on the cutoff frequency, i.e. the filter coefficients are updated to account for any change in the determined cutoff frequency (with respect to previous frames of the first and second audio signals). The filter bank is typically implemented using an analysis-synthesis filter bank or using time-domain filters such as finite impulse response, FIR, or infinite impulse response, IIR, filters. For example, a time-domain implementation of the filter bank may correspond to textbook Linkwitz-Riley crossover filters, e.g. of 4th order. A frequency-domain implementation of the filter bank may include applying a time to frequency conversion on the first audio signal and the second audio signal (or retrieving the first audio spectrum and the second audio spectrum produced during steps S22 and S23) and applying frequency weights which correspond respectively to a low-pass filter and to a high-pass filter. Then both weighted audio spectra are added together into an output spectrum that is converted back to the time-domain to produce the output signal, by using e.g. an inverse fast Fourier transform, IFFT.

Figure 3:
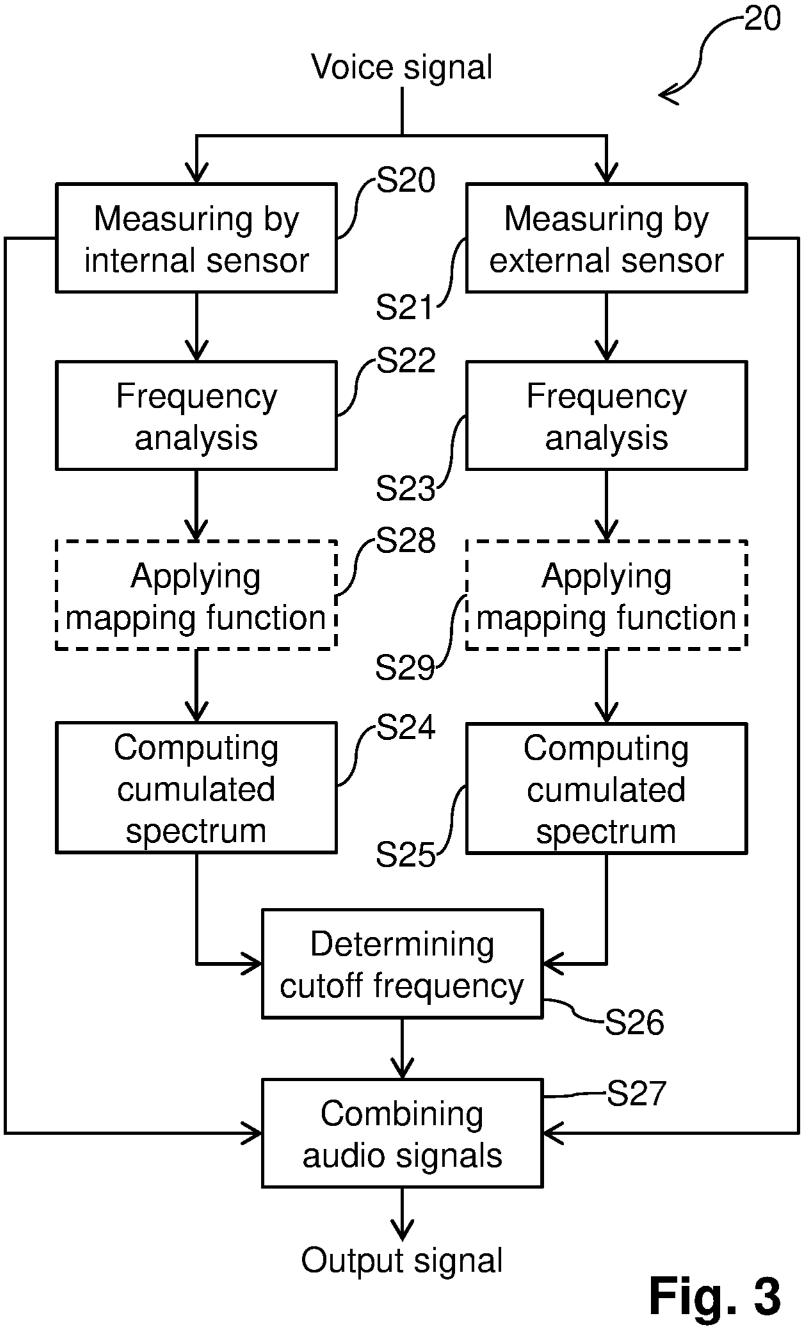
FIG. 3: a diagram representing the main steps of another exemplary embodiment of an audio signal processing method.

FIG. 3 represents schematically the main steps of a preferred embodiment of the audio signal processing method 20 in which the first audio spectrum and the second audio spectrum are mapped together. In this example, the mapping is performed before computing the first cumulated audio spectrum and the second cumulated audio spectrum, however it can also be performed on the first and second cumulated spectra in other examples.

The mapping of the first audio spectrum and the second audio spectrum aims at making their first cumulated audio spectrum and second cumulated audio spectrum comparable. For instance, the mapping aims at making the cutoff frequency determination behave as desired in predefined noise environment scenarios.

In the non-limitative example of FIG. 3, the mapping is performed by applying a mapping function to the first audio spectrum (step S28) and by applying another mapping function to the second audio spectrum (step S29). However, since the goal is to adapt mutually the first audio spectrum and the second audio spectrum, it is emphasized that the mapping can be equivalently performed by applying a mapping function to only one among the first audio spectrum and the second audio spectrum, for instance applied only to the first audio spectrum. Each mapping function comprises applying predetermined weighting coefficients to the first or second audio spectrum values.

In the sequel, we assume in a non-limitative manner that a mapping is function is applied only to the first audio spectrum (bone-conducted signal) and that the mapping function includes at least applying predetermined weighting coefficients to the first audio spectrum values. These predetermined weighting coefficients are multiplicative coefficients in linear scale, i.e. additive coefficients in logarithmic (decibel) scale. In linear scale, applying the weighting coefficients to the first audio spectrum $S_1$ values produces mapped first audio spectrum $S'_1$ values as follows:

$$S'_1(f_n)=S_1(f_n)\times a_1(f_n)$$

wherein $a_1(f_n)$ corresponds to the weighting coefficient for the frequency $f_n$.

Figure 4:
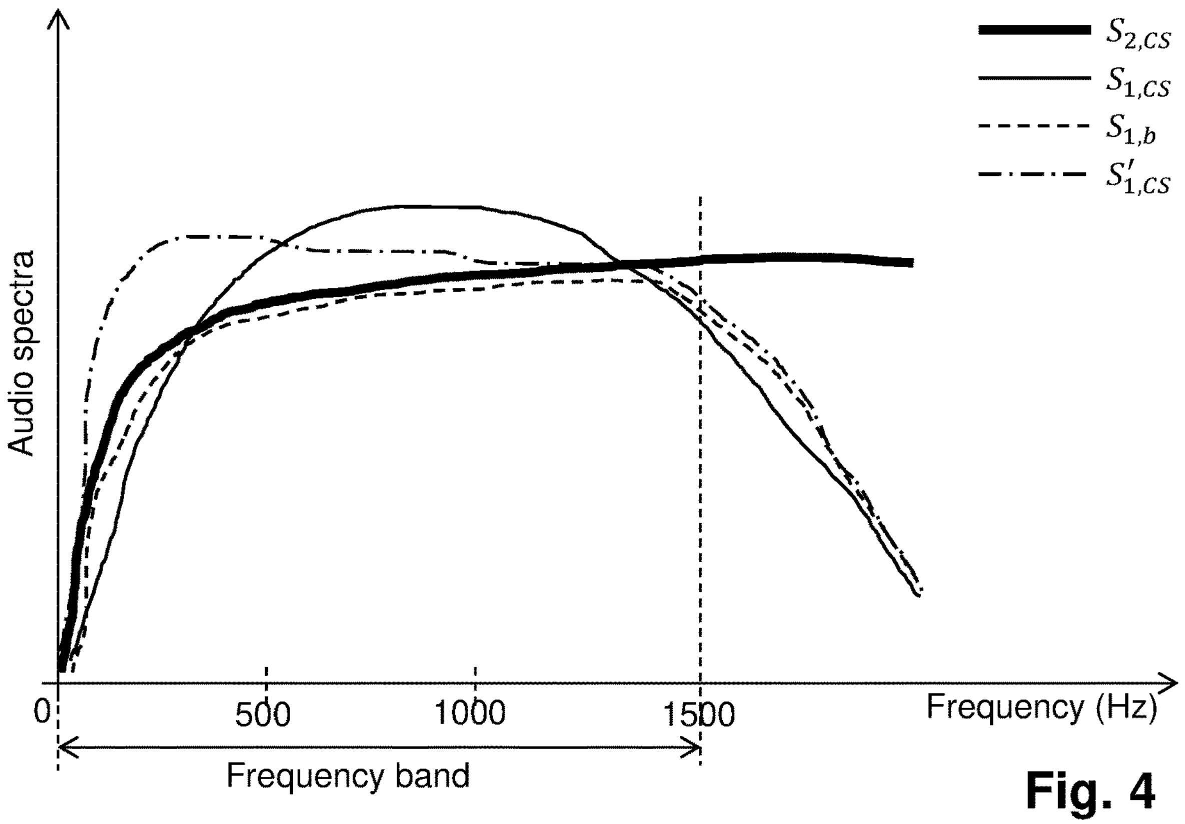
FIG. 4: a schematic representation of audio spectra obtained by applying a mapping function in a noiseless environment scenario.

FIG. 4 represents schematically a non-limitative example of how the weighting coefficients may be predetermined. In the example illustrated by FIG. 4, the weighting coefficients $a_1$ are assumed to be decomposed into weighting coefficients $b_1$ and $c_1$ such that, in linear scale:

$$a_1(f_n)=b_1(f_n)\times c_1(f_n)$$

The determination of the weighting coefficients is for instance based on reference voice signals recorded for multiple users in a noiseless environment scenario, referred to as clean speech. FIG. 4 represents schematically a mean clean speech second audio spectrum $S_{2,CS}$ obtained for the external sensor 12 and a mean clean speech first audio spectrum $S_{1,CS}$ obtained for the internal sensor 11. Based on these, the weighting coefficients $b_1$ are for instance determined to align the first audio spectrum with the second audio spectrum in the frequency band, thereby producing a modified mean clean speech first audio spectrum $S_{1,b}$ such that:

$$S_{1,b}(f_n)=S_{1,CS}(f_n)\times b_1(f_n)\approx S_{2,CS}(f_n)$$

FIG. 4 represents schematically the modified mean clean speech first audio spectrum $S_{1,b}$ which is substantially aligned with the mean clean speech second audio spectrum $S_{2,CS}$ in the frequency band. In this non-limitative example, the frequency band is further assumed to correspond to the frequencies in [0, 1500] hertz.

Generally speaking, the first audio signal should be favored for low frequencies in the presence of noise in the second audio signal. Hence, the weighting coefficients $c_1$ are for instance predetermined to increase the modified mean clean speech first audio spectrum $S_{1,b}$ for the lowest frequencies of the frequency band to let the modified mean clean speech first audio spectrum $S_{1,b}$ substantially unchanged for the highest frequencies of the frequency band. For instance, the weighting coefficients $c_1$ are such that $c_1(f_n)\geq 1$ for any $1\leq n\leq N$, and decrease from the minimum frequency $f_{min}$ to the maximum frequency $f_{max}$. For instance, the weighting coefficients $c_1$ are, in logarithmic (decibel, dB) scale, such that:

$$\begin{cases} c_{1,dB}(f_n) = 3\text{ dB for } f_n \in [0, 500[\text{hertz} \\ c_{1,dB}(f_n) = 1.5\text{ dB for } f_n \in [500, 1000[\text{hertz} \\ c_{1,dB}(f_n) = 0\text{ dB for } f_n \in [1000, 1500]\text{ hertz} \end{cases}$$

FIG. 4 represents schematically the mapped mean clean speech first audio spectrum $S'_{1,CS}$ which is obtained after applying the weighting coefficients $c_1$ to the modified mean clean speech first audio spectrum $S_{1,b}$.

More generally speaking, the weighting coefficients $c_1$ (and $a_1$) can be predetermined to make the cutoff frequency determination behave as desired in predefined reference noise environment scenarios for the reference first and second audio signals. In addition to the noiseless environment scenarios (clean speech signals), other reference noisy environment scenarios may include different types of noises (colored and white noises) with different levels. For each reference noise environment scenario, a desired cutoff frequency may be predefined, and the weighting coefficients are for instance predetermined during a prior calibration phase in order to obtain approximately the desired cutoff frequency when applied to the corresponding reference noise environment scenario.

Figure 5:
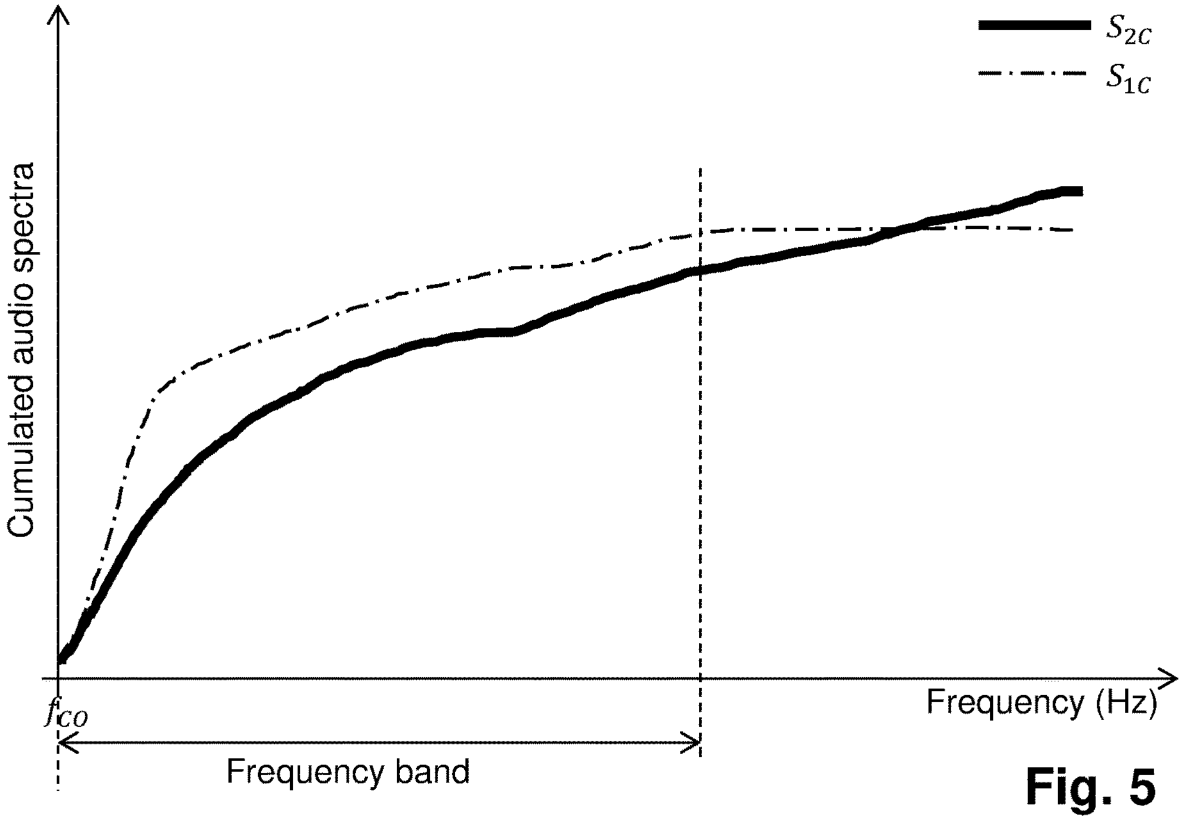
FIG. 5: a schematic representation of cumulated audio spectra obtained by applying a mapping function in a noiseless environment scenario.

In the sequel, we first assume that the first and second audio spectrum values are cumulated in the same direction, for instance from the minimum frequency to the maximum frequency. In a non-limitative manner, we assume that the first cumulated audio spectrum is computed according to equation (1) and that the second cumulated audio spectrum is computed according to equation (4). We further assume in a non-limitative manner that the cutoff frequency is determined based on the highest frequency for which the first cumulated audio spectrum is below the second cumulated audio spectrum. In such a case, the weighting coefficients are for instance predetermined to ensure that, in the absence of noise in the first audio signal and the second audio signal (clean speech, i.e. noiseless environment scenario), the first cumulated audio spectrum remains above the second cumulated audio spectrum in the whole frequency band and the cutoff frequency corresponds to the minimum frequency of the frequency band. This is the case, for instance, for the weighting coefficients illustrated in FIG. 4, as illustrated by FIG. 5 which shows the first cumulated audio spectrum $S_{1C}$ and the second cumulated audio spectrum $S_{2C}$ obtained for said weighting coefficients shown in FIG. 4.

Figure 6:
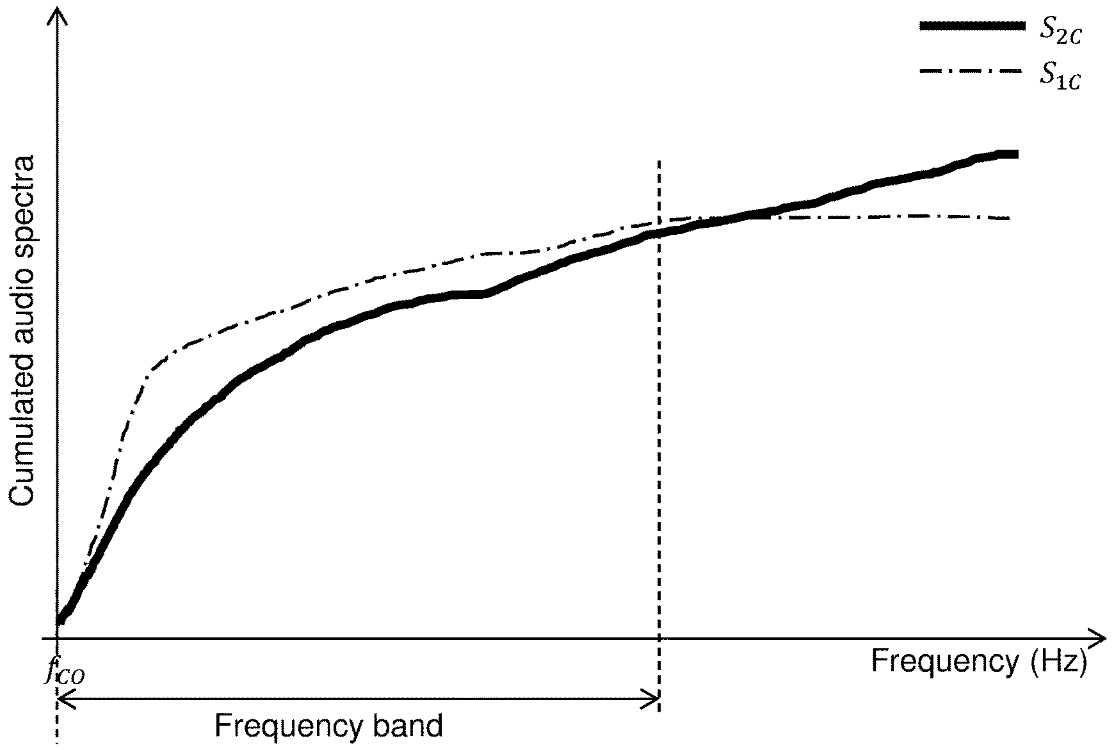
FIG. 6: a schematic representation of cumulated audio spectra obtained by applying a mapping function in a white noise environment scenario.
Figure 6:
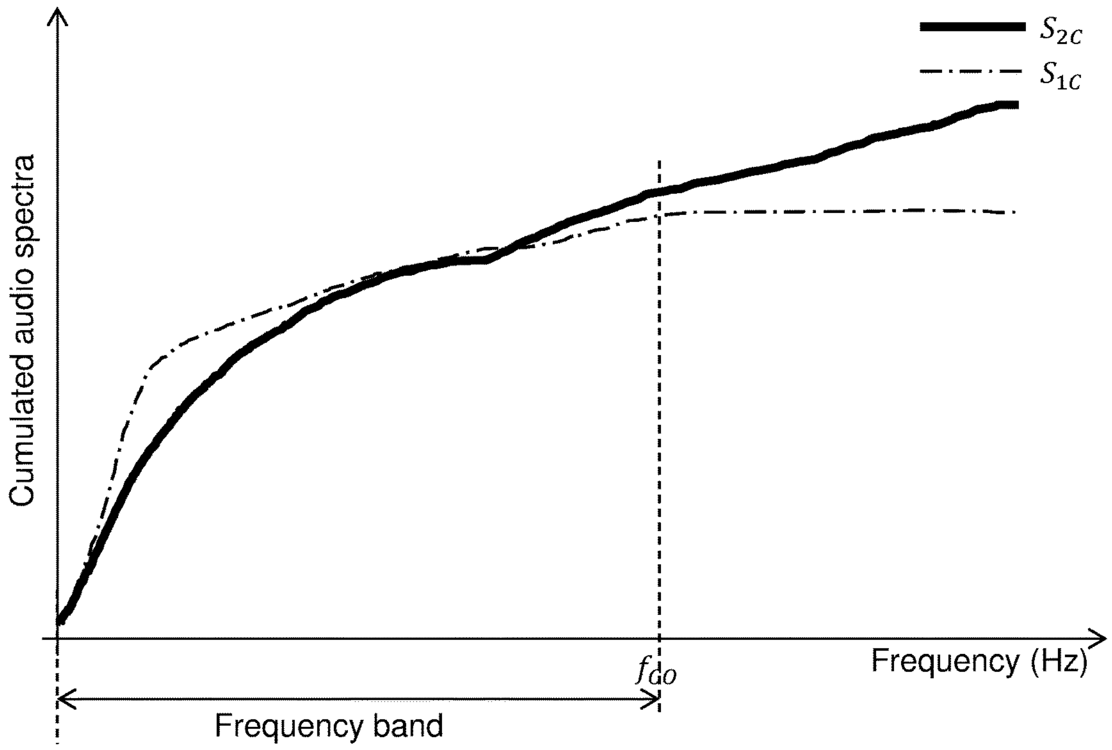

FIG. 6 represents schematically, under the same assumptions, the desired behavior for the cutoff frequency determination in the presence of white noise in the second audio signal in the frequency band (and no or little white noise in the first audio signal, since it is a bone-conducted signal). More specifically, part a) of FIG. 6 represents the case where the white noise level in the second audio signal is low while part b) of FIG. 6 represents the case where the white noise level in the second audio signal is high.

As can be seen in part a) of FIG. 6, the first cumulated audio spectrum $S_{1C}$ remains above the second cumulated audio spectrum $S_{2C}$ in the whole frequency band, such that the cutoff frequency selected is the minimum frequency $f_{min}$, thereby favoring the second audio signal in the frequency band during the combining step S27.

As can be seen in part b) of FIG. 6, due to the white noise level in the second audio signal, the first cumulated audio spectrum $S_{1C}$ becomes lower than the second cumulated audio spectrum $S_{2C}$ in the frequency band and remains below said second cumulated audio spectrum $S_{2C}$ up to the maximum frequency $f_{max}$. Hence, the cutoff frequency selected is the maximum frequency $f_{max}$, thereby favoring the first audio signal in the frequency band during the combining step S27. Hence, the weighting coefficients are for instance determined such that, in the presence of white noise affecting the second audio signal and having a level above a predetermined threshold, the first cumulated audio spectrum is lower than the second cumulated audio spectrum for at least the maximum frequency $f_{max}$ of the frequency band, such that the selected cutoff frequency corresponds to the maximum frequency $f_{max}$.

Figure 7:
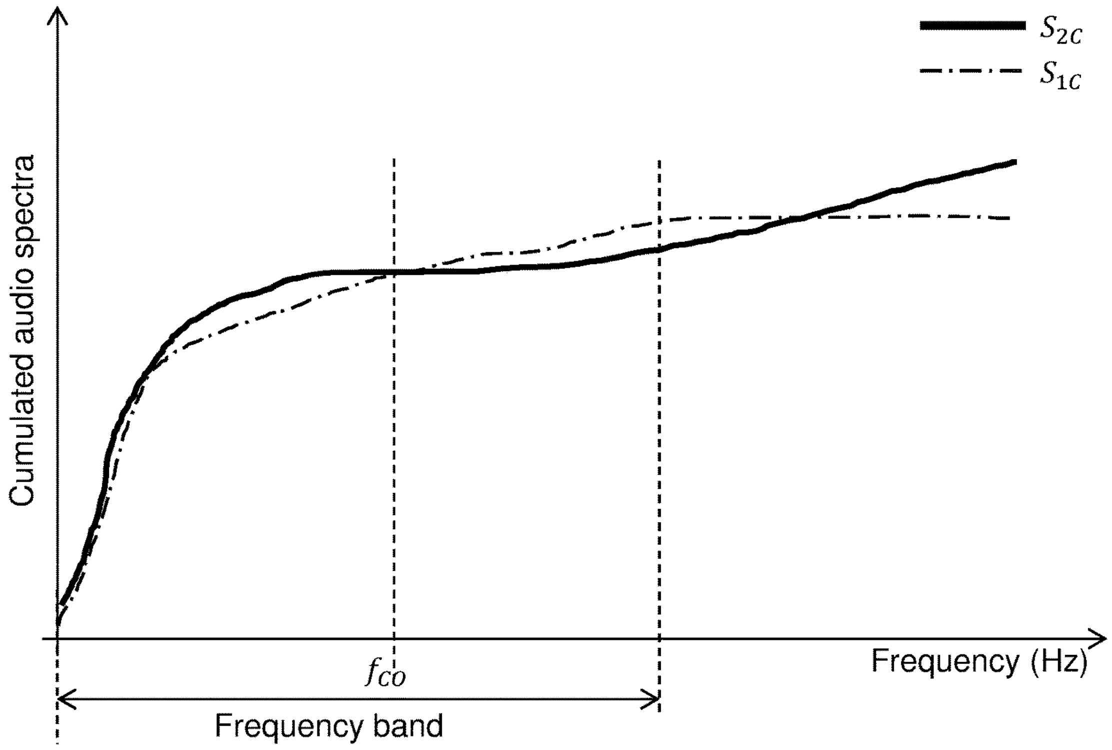
FIG. 7: a schematic representation of cumulated audio spectra obtained by applying a mapping function in a colored noise environment scenario.
Figure 7:
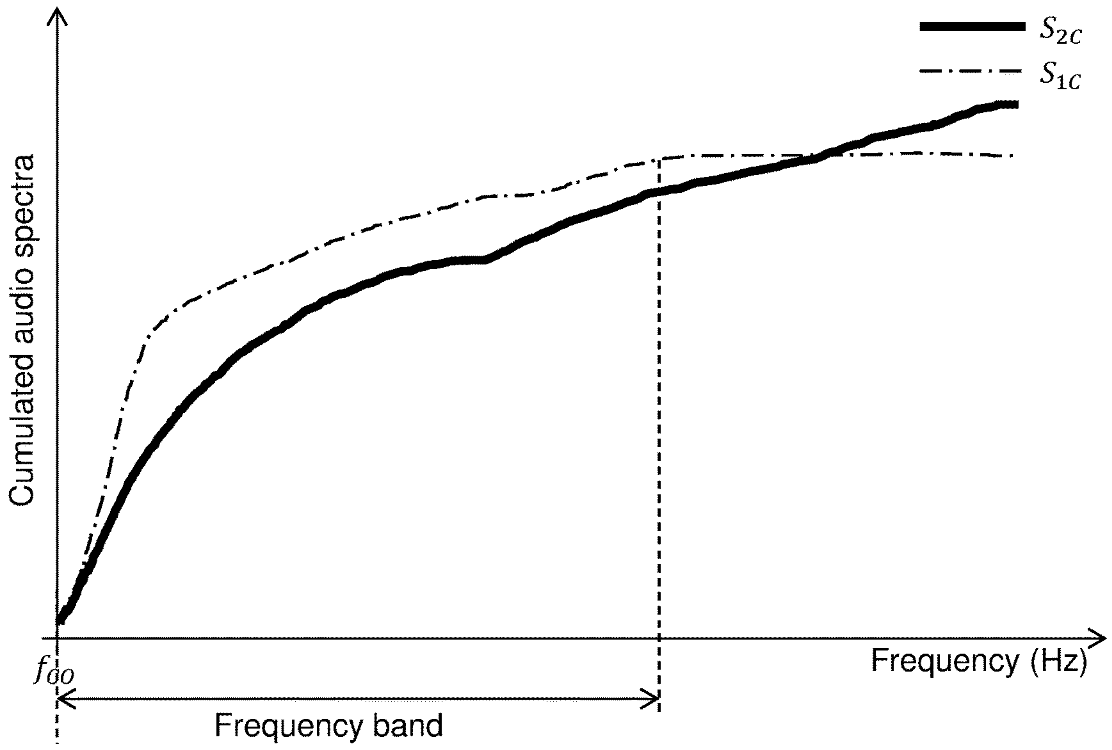

FIG. 7 represents schematically, under the same assumptions, the desired behavior for the cutoff frequency determination in the presence of colored noise, in the frequency band, in either one of the first audio spectrum and the second audio spectrum. More specifically, part a) of FIG. 7 represents the case where the second audio signal comprises only a low frequency colored noise in the frequency band (e.g. voice speech recorded in a car) and the first audio signal is not affected by noise. Part b) of FIG. 7 represents the case where the first audio signal comprises a low frequency colored noise in the frequency band (e.g. user's teeth tapping or user's finger scratching the earbuds) and the second audio signal comprises a high-level white noise.

As can be seen in part a) of FIG. 7, due to the low frequency colored noise in the second audio signal, the first cumulated audio spectrum $S_{1C}$ is initially higher than the second cumulated audio spectrum $S_{2C}$ and becomes lower than the second cumulated audio spectrum $S_{2C}$. The first cumulated audio spectrum $S_{1C}$ crosses again the second cumulated audio spectrum $S_{2C}$ at a crossing frequency and then remains above said second cumulated audio spectrum $S_{2C}$ up to the maximum frequency $f_{max}$. Hence, the cutoff frequency $f_{CO}$ selected is the crossing frequency, thereby favoring the first audio signal below the crossing frequency and favoring the second audio signal above the crossing frequency during the combining step S27.

As can be seen in part b) of FIG. 7, due to the low frequency colored noise in the first audio signal, and despite the high-level white noise in the second audio signal, the first cumulated audio spectrum $S_{1C}$ remains above the second cumulated audio spectrum $S_{2C}$ in the whole frequency band, such that the cutoff frequency selected is the minimum frequency $f_{min}$, thereby favoring the second audio signal in the frequency band during the combining step S27.

Hence during the prior calibration phase, the weighting coefficients may be determined to make the cutoff frequency determination behave as illustrated by FIG. 6 and FIG. 7, for instance.

We now assume that the first and second audio spectrum values are cumulated in opposite directions. In a non-limitative manner, we assume that the first cumulated audio spectrum is computed according to equation (1) and that the second cumulated audio spectrum is computed according to equation (8). In such a case, the weighting coefficients may consist in $a_1(f_n)=b_1(f_n)$, i.e. without considering the weighting coefficients $c_1$. As discussed above, the weighting coefficients $b_1$ are for instance determined to align the first audio spectrum with the second audio spectrum in the frequency band, thereby producing a modified mean clean speech first audio spectrum $S_{1,b}$ such that:

$$S_{1,b}(f_n)=S_{1,CS}(f_n)\times b_1(f_n)\approx S_{2,CS}(f_n)$$

However, it is also possible to consider weighting coefficients $c_1$ as discussed above, for instance to favor the second audio signal in the absence of noise in both the first and second audio signals.

In other embodiments, it is possible to apply predetermined offset coefficients to the mapped first audio spectrum values and/or the mapped second audio spectrum values. For instance, if we assume that a mapping function is applied only to the first audio spectrum, then the mapped first audio spectrum $S'^1$ may be modified as follows (in linear scale):

$$S'_1(f_n)\leftarrow S'_1(f_n)+\varepsilon_1(f_n)$$

wherein $\varepsilon_1(f_n)\geq 0$ corresponds to the offset coefficient applied for the frequency $f_n$. In some embodiments, the offset coefficient may be the same for all the frequencies. The offset coefficients are introduced to prevent from having mapped first and/or second audio spectrum values that are too small.

Alternatively, to prevent from having mapped first and/or second audio spectrum values that are too small, it is possible to perform a thresholding on the mapped first audio spectrum values and/or the mapped second audio spectrum values, with respect to at least one predetermined threshold. For instance, if we assume that a mapping function is applied only to the first audio spectrum, then the mapped first audio spectrum $S'_1$ may be modified as follows (in linear scale):

$$S'_1(f_n)\leftarrow \max(S'_1(f_n),v_1(f_n))$$

wherein $v_1(f_n)>0$ corresponds to the threshold applied for the frequency $f_n$. In preferred embodiments, the threshold may be the same for all the frequencies in the frequency band.

Alternatively, or in combination thereof, it is possible to perform a thresholding on the mapped first audio spectrum values and/or the mapped second audio spectrum values, with respect to at least one predetermined threshold to prevent from having mapped first and/or second audio spectrum values that are too large. For instance, if we assume that a mapping function is applied only to the first audio spectrum, and that offset coefficients are also used, then the mapped first audio spectrum $S'_1$ may be modified as follows (in linear scale):

$$S'_1(f_n)\leftarrow \min(S'_1(f_n)+\varepsilon_1(f_n),V_1(f_n))$$

wherein $V_1(f_n)>0$ corresponds to the threshold applied for the frequency $f_n$. In preferred embodiments, the threshold may be the same for all the frequencies in the frequency band.

It should be noted that the mapping of the first audio spectrum and the second audio spectrum (by applying a mapping function to the first audio spectrum and/or the second audio spectrum) is not required in all embodiments. For instance, the internal sensor 11 and the external sensor 12 may already produce first audio spectra and second audio spectra having the desired properties with respect to the predetermined noise environment scenarios, such that no mapping is needed. Also, the weighting coefficients applied by the mapping function are typically determined during a prior calibration phase. Hence, these weighting coefficients can also be applied directly by the internal sensor 11 and/or the external sensor 12 before outputting the first audio signal and the second audio signal, such that the first audio spectrum and the second audio spectrum can be directly used to determine the cutoff frequency without requiring any mapping.

It is emphasized that the present disclosure is not limited to the above exemplary embodiments. Variants of the above exemplary embodiments are also within the scope of the present invention.

For instance, the present disclosure has been provided by considering mainly instantaneous audio frequency spectra. Of course, in other embodiments, it is also possible to compute averaged audio frequency spectra by considering a plurality of successive data frames of audio signals.

Also, the cutoff frequency may be directly applied, or it can optionally be smoothed over time using an averaging function, e.g. an exponential averaging with a configurable time constant. Also, in some cases, the cutoff frequency may be clipped to a configurable lower frequency (different from the minimum frequency of the frequency band) and higher frequency (different from the maximum frequency of the frequency band).

The invention claimed is:

1. An audio signal processing method, comprising measuring a voice signal emitted by a user, said measuring of the voice signal being performed by at least two sensors which include an internal sensor and an external sensor, wherein the internal sensor is arranged to measure voice signals which propagate internally to a head of the user and the external sensor is arranged to measure voice signals which propagate externally the head of the user, wherein the internal sensor produces a first audio signal and the external sensor produces a second audio signal, wherein the audio signal processing method further comprises:

processing the first audio signal to produce a first audio spectrum on a frequency band, processing the second audio signal to produce a second audio spectrum on a the frequency band, computing a first cumulated audio spectrum by cumulating first audio spectrum values from a minimum frequency of the frequency band to a maximum frequency of the frequency band, computing a second cumulated audio spectrum by cumulating second audio spectrum values from the minimum frequency of the frequency band to the maximum frequency of the second frequency band, determining, by dynamically comparing the first cumulated audio spectrum and the second audio spectrum, a cutoff frequency that is based on the highest frequency in the frequency band for which the first cumulated audio spectrum is below the second cumulated audio spectrum, and producing an output signal by combining the first audio signal and the second audio signal based on the cutoff frequency, including:

low-pass filtering the first audio signal based on the cutoff frequency to produce a filtered first audio signal high-pass filtering the second audio signal based on the cutoff frequency to produce a filtered second audio signal, and combining the filtered first audio signal and the filtered second audio signal to produce the output signal.

2. The audio signal processing method according to claim 1, further comprising mapping the first audio spectrum and the second audio spectrum, wherein mapping the first audio spectrum and the second audio spectrum comprises applying predetermined weighting coefficients to the first audio spectrum and/or the second audio spectrum.

3. The audio signal processing method according to claim 2, further comprising applying predetermined offset coefficients to the first audio spectrum and/or the second audio spectrum.

4. The audio signal processing method according to claim 2, further comprising thresholding the first audio spectrum and/or the second audio spectrum with respect to at least one predetermined threshold.

5. An audio signal processing system comprising at least two sensors which include an internal sensor and an external sensor, wherein the internal sensor is arranged to measure voice signals which propagate internally to a head of a user and the external sensor is arranged to measure voice signals which propagate externally to the head of the user, wherein the internal sensor is configured to produce a first audio signal by measuring a voice signal emitted by the user and the external sensor is configured to produce a second audio signal by measuring the voice signal emitted by the user, said audio signal processing system further comprising a processing circuit comprising at least one processor and at least one memory, wherein said processing circuit is configured to:

process the first audio signal to produce a first audio spectrum on a first frequency band, process the second audio signal to produce a second audio spectrum on a the frequency band, compute a first cumulated audio spectrum by cumulating first audio spectrum values from a minimum frequency of the frequency band to a maximum frequency of the frequency band, compute a second cumulated audio spectrum by cumulating second audio spectrum values from the minimum frequency of the frequency band to the maximum frequency of the second frequency band, determine, by dynamically comparing the first cumulated audio spectrum and the second cumulated audio spectrum, a cutoff frequency that is based on the highest frequency in the frequency band for which the first cumulated audio spectrum is below the second cumulated audio spectrum, and produce an output signal by combining the first audio signal and the second audio signal based on the cutoff frequency, including:

low-pass filtering the first audio signal based on the cutoff frequency to produce a filtered first audio signal, high-pass filtering the second audio signal based on the cutoff frequency to produce a filtered second audio signal, and combining the filtered first audio signal and the filtered second audio signal to produce the output signal.

6. The audio signal processing system according to claim 5, wherein the processing circuit is further configured to map the first audio spectrum and the second audio spectrum before computing the first cumulated audio spectrum and the second cumulated audio spectrum, wherein mapping the first audio spectrum and the second audio spectrum comprises applying predetermined weighting coefficients to the first audio spectrum and/or the second audio spectrum in the frequency band.

7. The audio signal processing system according to claim 6, wherein the processing circuit is further configured to apply predetermined offset coefficients to the first audio spectrum and/or the second audio spectrum.

8. The audio signal processing system according to claim 6, wherein the processing circuit is further configured to threshold the first audio spectrum and/or the second audio spectrum with respect to at least one predetermined threshold.

9. The audio signal processing system according to claim 5, wherein the audio signal processing system is included in a wearable device.

10. The audio signal processing system according to claim 9, wherein the audio signal processing system is included in earbuds or in earphones.

11. A non-transitory computer readable medium comprising computer readable code to be executed by an audio signal processing system comprising at least two sensors which include an internal sensor and an external sensor, wherein the internal sensor is arranged to measure voice signals which propagate internally to a head of a user and the external sensor is arranged to measure voice signals which propagate externally to the head of the user, wherein the audio signal processing system further comprises a processing circuit comprising at least one processor and at least one memory, wherein said computer readable code cause said audio signal processing system to:

produce, by the internal sensor, a first audio signal by measuring a voice signal emitted by the user, produce, by the external sensor, a second audio signal by measuring the voice signal emitted by the user, process the first audio signal to produce a first audio spectrum on a frequency band, process the second audio signal to produce a second audio spectrum on a the frequency band, compute a first cumulated audio spectrum by cumulating first audio spectrum values from a minimum frequency of the frequency band to a maximum frequency of the frequency band, compute a second cumulated audio spectrum by cumulating second audio spectrum values from the minimum frequency of the frequency band to the maximum frequency of the frequency band, determine, by dynamically comparing the first cumulated audio spectrum and the second cumulated audio spectrum a cutoff frequency, that is based on the highest frequency in the frequency band for which the first cumulated audio spectrum is below the second cumulated audio spectrum, and produce an output signal by combining the first audio signal and the second audio signal based on the cutoff frequency, including:

low-pass filtering the first audio signal based on the cutoff frequency to produce a filtered first audio signal, high-pass filtering the second audio signal based on the cutoff frequency to produce a filtered second audio signal, and combining the filtered first audio signal and the filtered second audio signal to produce the output signal.

12. An audio signal processing method, comprising measuring a voice signal emitted by a user, said measuring of the voice signal being performed by at least two sensors which include an internal sensor and an external sensor, wherein the internal sensor is arranged to measure voice signals which propagate internally to a head of a user and the external sensor is arranged to measure voice signals which propagate externally to the head of the user, wherein the internal sensor produces a first audio signal and the external sensor produces a second audio signal, wherein the audio signal processing method further comprises:

processing the first audio signal to produce a first audio spectrum on a frequency band, processing the second audio signal to produce a second audio spectrum on the frequency band, mapping the first audio spectrum and the second audio spectrum including applying predetermined weighting coefficients to the first audio spectrum and/or the second audio spectrum, computing a first cumulated audio spectrum by cumulating first audio spectrum values, wherein the first cumulated audio spectrum is determined by cumulating the first audio spectrum values from a minimum frequency of the frequency band to a maximum frequency of the frequency band, computing a second cumulated audio spectrum by cumulating second audio spectrum values, wherein the second cumulated audio spectrum is determined by cumulating the second audio spectrum values from the minimum frequency of the frequency band to the maximum frequency of the frequency band, determining a cutoff frequency by comparing the first cumulated audio spectrum and the second cumulated audio spectrum, wherein the cutoff frequency is determined based on a highest frequency in the frequency band for which the first cumulated audio spectrum is below the second cumulated audio spectrum and corresponds to the minimum frequency of the frequency band if the first cumulated audio spectrum is above the second cumulated audio spectrum over the frequency band, and wherein the predetermined weighting coefficients are predetermined based on reference first audio signals and based on reference second audio signals, such that:

in the absence of noise in the reference first audio signals and the reference second audio signals, a reference mean first cumulated audio spectrum is above a reference mean second cumulated audio spectrum over the frequency band, and in the presence of white noise affecting the reference second audio signals and having a level above a predetermined threshold, and in the absence of noise in the reference first audio signals, the reference mean first cumulated audio spectrum is below the reference mean second cumulated audio spectrum for at least the maximum frequency of the frequency band, and producing an output signal by combining the first audio signal and the second audio signal based on the cutoff frequency.

13. The audio signal processing method according to claim 12, wherein producing the output signal comprises:

low-pass filtering the first audio signal based on the cutoff frequency to produce a filtered first audio signal, high-pass filtering the second audio signal based on the cutoff frequency to produce a filtered second audio signal, and combining the filtered first audio signal and the filtered second audio signal to produce the output signal.

14. An audio signal processing system comprising at least two sensors which include an internal sensor and an external sensor, wherein the internal sensor is arranged to measure voice signals which propagate internally to a head of a user and the external sensor is arranged to measure voice signals which propagate externally to the head of the user, wherein the internal sensor is configured to produce a first audio signal by measuring a voice signal emitted by the user and the external sensor is configured to produce a second audio signal by measuring the voice signal emitted by the user, said audio signal processing system further comprising a processing circuit comprising at least one processor and at least one memory, wherein said processing circuit is configured to:

process the first audio signal to produce a first audio spectrum on a frequency band, process the second audio signal to produce a second audio spectrum on the frequency band, map the first audio spectrum and the second audio spectrum before computing a first cumulated audio spectrum and a second cumulated audio spectrum including applying predetermined weighting coefficients to the first audio spectrum and/or the second audio spectrum in the frequency band, compute the first cumulated audio spectrum by cumulating first audio spectrum values, wherein the first cumulated audio spectrum is determined by cumulating the first audio spectrum values from a minimum frequency of the frequency band to a maximum frequency of the frequency band, compute the second cumulated audio spectrum by cumulating second audio spectrum values, wherein the second cumulated audio spectrum is determined by cumulating the second audio spectrum values from the minimum frequency of the frequency band to the maximum frequency of the frequency band, determine a cutoff frequency by comparing the first cumulated audio spectrum and the second cumulated audio spectrum, wherein the cutoff frequency is determined based on a highest frequency in the frequency band for which the first cumulated audio spectrum is below the second cumulated audio spectrum and corresponds to the minimum frequency of the frequency band if the first cumulated audio spectrum is above the second cumulated audio spectrum over the frequency band, and wherein the predetermined weighting coefficients are predetermined based on reference first audio signals and based on reference second audio signals, such that:

in the absence of noise in the reference first audio signals and the reference second audio signals, a reference mean first cumulated audio spectrum is above a reference mean second cumulated audio spectrum over the frequency band, and in the presence of white noise affecting the reference second audio signals and having a level above a predetermined threshold, and in the absence of noise in the reference first audio signals, the reference mean first cumulated audio spectrum is below the reference mean second cumulated audio spectrum for at least the maximum frequency of the frequency band, and produce an output signal by combining the first audio signal and the second audio signal based on the cutoff frequency.

15. The audio signal processing system according to claim 14, wherein the processing circuit is further configured to produce the output signal by:

low-pass filtering the first audio signal based on the cutoff frequency to produce a filtered first audio signal, high-pass filtering the second audio signal based on the cutoff frequency to produce a filtered second audio signal, and combining the filtered first audio signal and the filtered second audio signal to produce the output signal.

* * * * *